Patented Aug. 31, 1954

2,688,016

UNITED STATES PATENT OFFICE 2,688,016

PREPARATION OF SULFUR CONTAINING TRIAZINES

John J. Roemer, Tamaqua, Pa., and Donald W. Kaiser, Old Greenwich, Conn., assignors to American Cyanamid Company, New York, N. Y., a corporation of Maine No Drawing. Application May 21, 1953, Serial No. 356,592

5 Claims. (Cl. 260—249.5)

The present invention relates to a new synthesis of sulfur containing triazines. More particularly the invention concerns the preparation of thioammeline and dithioammelide.

It is an object of the invention to react metal salts of dicyanoguanidine with hydrogen sulfide under pressure in an inert menstruum to provide a reaction mass containing thioammeline and a salt of dithioammelide. Additional objects will be apparent from the description of the invention.

It has been found that when a metal salt of dicyanoguanidine, such as potassium dicyanoguanidine, is heated with hydrogen sulfide in an inert solvent under pressure, a reaction mass is formed containing thioammeline and the corresponding dithioammelide salt.

The following examples illustrate without limiting the invention.

Example 1

Potassium dicyanoguanidine (74 g. 0.5 moles), 200 cc. of water, and hydrogen sulfide (68 g., 2.0 moles) were charged to a 300 cc. autoclave and heated at 100° C. for 2 hours under the autogenously developed pressure, which varied from 95-235 p. s. i. At the end of this time the partially liquid product was removed from the autoclave and filtered. The residue on the filter consisted of a mixture of crude thioammeline and crude potassium dithioammelide. The two desired products were separated in the known way, i. e., the mixture was suspended in 250 cc. of boiling water, and washed with successive portions of boiling water (100, 100, and 50 cc.) to leach out potassium dithioammelide (which is soluble in hot water). The insoluble residue consisted of 30 g. of slightly impure thioammeline. This thioammeline was purified in the known way, i. e. by solution in dilute KOH, and treatment with activated charcoal, followed by filtering and acidifying the filtrate with acetic acid to precipitate 29 g. of white thioammeline, which was filtered and recovered. To recover free dithioammelide, the original filtrate and the hot water extracts were combined, treated with activated charcoal and filtered. The filtrate so obtained was acidified with acetic acid to precipitate 35 g. of free dithioammelide, which was filtered and recovered.

Example 2

Following the same procedure of Example 1, 0.5 moles of calcium dicyanoguanidine slurried in 200 cc. of dioxane and 2.0 moles of hydrogen sulfide were charged to a 300 cc. autoclave and heated at 80° C. for 2 hours under the autogenously developed pressure. The reaction mass was worked up as in Example 1 to give 26 g. of purified thioammeline and 31 g. of purified dithioammelide.

Virtually any metal salt of dicyanoguanidine can be used in the process of this invention, e. g., sodium dicyanoguanidine, ammonium dicyanoguanidine, barium dicyanoguanidine, magnesium dicyanoguanidine, zinc dicyanoguanidine, and the like. The ratio of the dicyanoguanidine salt to the hydrogen sulfide reactant is not critical; a mole ratio of the respective reactants with the range of 1–100:1–100 can be used, and some thioammeline and dithioammelide salt will be formed. It is preferred however to use hydrogen sulfide in several molar excess over the dicyanoguanidine salt. While the reaction is conveniently conducted under the autogenously developed pressure, actually the pressure may vary over a range of about 50 to 5,000 p. s. i., or even higher. The temperature should be at least 60° C., but is preferably not in excess of 200° C. The preferred range is about 80°–150° C. At the higher temperatures, the period of reaction is preferably reduced to 5 to 30 minutes in order to inhibit decomposition of the products. Various inert reaction media can be used, such as acetone, the cellosolves, and other neutral water-miscible substances. In fact some of the desired products will be obtained even when the solvent is omitted, but the yields are relatively low.

When the dicyanoguanidine was originally discovered, per U. S. Patent 2,371,100, it was considered to have the formula

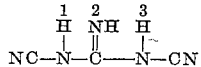

1,3-dicyanoguanidine. This symmetrical formula suggests that the free acid dicyanoguanidine should be dibasic. Up to the present time, however, no dibasic salts of dicyanoguanidine have been prepared, but instead only the monobasic salts, e. g., potassium dicyanoguanidine, which might be named 1-potassium, 1,3-dicyanoguanidine by the original nomenclature. For this and other reasons, it is now belived that the formula of dicyanoguanidine as prepared in above Patent 2,371,100 is best represented as that of an unsymmetric monobasic acid, which may be considered at structural tautomer of the symmerical form, thus:

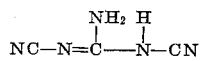

The potassium salt would thus be best represented by the formula

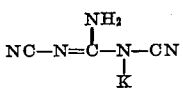

or (identically) as

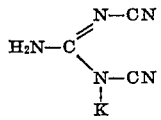

the latter being named preferably 1-potassium, 1,2-dicyanoguanidine. Accordingly, when dicyanoguanidine is mentioned in this specification, the compound referred to is that prepared by the procedure of U. S. Patent 2,371,100, there named 1,3-dicyanoguanidine, but which is probably preferably named as the tautomer 1,2-dicyanoguanidine. So far as is known, the 1,1-dicyanoguanidine isomer does not exist.

This is a continuation-in-part of the applicants' copending application, Serial No. 296,933, filed July 2, 1952, now abandoned.

We claim:

1. The method of preparing a reaction mass containing thioammeline and a dithioammelide salt that comprises subjecting a metal salt of a dicyanoguanidine tautomer of the group consisting of

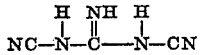

and

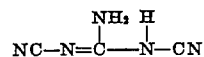

to the action of hydrogen sulfide under superatmospheric pressure at a temperature in the range of about 60° to 200° C.

2. The method according to claim 1 in which the reaction is conducted in an inert menstruum.

3. The method according to claim 2 in which the inert menstruum is water and the temperature is 80°–150° C.

4. The method of preparing a reaction mass containing thioammeline and potassium dithioammelide that comprises treating a potassium dicyanoguanidine tautomer of the group consisting of

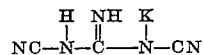

and

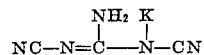

with a molar excess of hydrogen sulfide in an aqueous menstruum under superatmospheric pressure at a temperature in the range of 80°–150° C.

5. The method according to claim 4 in which the potassium dicyanoguanidine is reacted with a molar excess of hydrogen sulfide in water at about 100° C. under the autogenously developed pressure.

No references cited.